United States Patent Office 3,317,154
Patented May 2, 1967

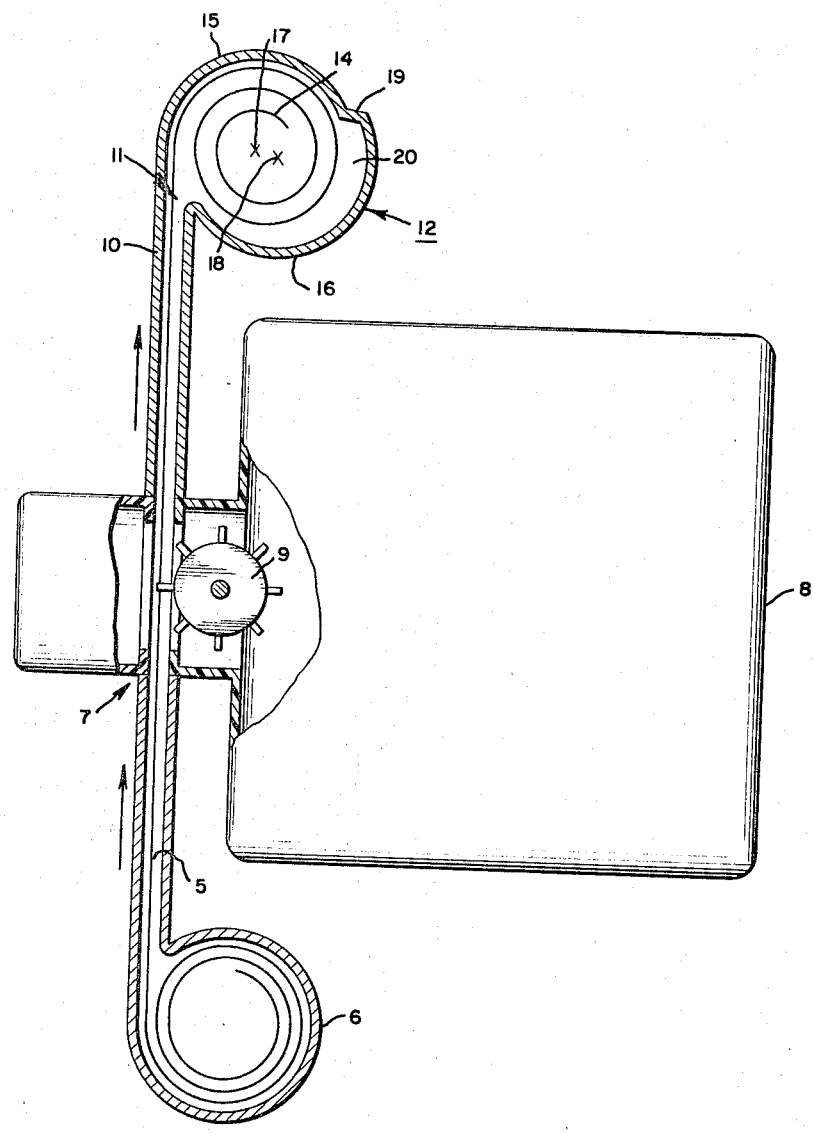

---

3,317,154
FILM CANNISTER
John C. L. Leslie, Albuquerque, N. Mex., assignor to Educational Research Associates, Inc., Albuquerque, N. Mex., a corporation of New Mexico
Filed Sept. 3, 1965, Ser. No. 485,017
1 Claim. (Cl. 242—71.2)

This invention relates to a film receptacle and more particularly it relates to a spoolless film cannister which receives and coils free film pushed thereinto.

In projectors processing short lengths of film, such as used for a series of still projections on a film strip, it is customary to push the film into a spoolless cylindrical cannister which coils the film. This is acceptable for very small coils, but as the lengths of the film increase, the coils push the outer layer into frictional contact with the cannister wall and the film binds. Thus normally a spooler is required for such longer lengths of film.

It is therefore an object of the present invention to provide an improved spoolless film cannister into which greater lengths of film may be pushed and coiled without binding.

In accordance with this invention therefore it has been found that the simple expedient of deforming the cylindrical wall of the cannister, such as by offsetting two substantially semi-cylindrical wall portions, will permit the film to be entered and coiled without binding. Such a configuration is illustrated in the single figure of the drawing which shows a section view of the film and cannister as used with a typical projector.

In general a film strip 5 is pulled from a supply cannister 6 past the film gate 7 in projector 8 by means of an advance sprocket 9 which is either manually or mechanically advanced from frame to frame as each picture is viewed and replaced by another.

The film strip is guided by channel 10 as it leaves the projector into the entryway 11 of the receptacle cannister 12, into which it is pushed to form the coil 14. In order to prevent the expansion and binding on the wall surface of the cannister, it is formed of two substantially semi-cylindrical wall sections 15, 16 having respective axes 17, 18 offset to form an offsetting indentation 19 in the wall of the cannister.

Thus, the film strip 5 is pushed into the cannister and conforms into a coil as it engages and creeps around the wall of the upper section 15. However, as the indentation 19 is reached the film strip does not frictionally contact the wall of the lower section 16 in the region 20. It has been found in accordance with this invention therefore that the film freely forms into the coil 14 without binding and that the outward pressure of the film coil does not substantially interfere with the coiling operation as the film is pushed into the cannister 12, when the offset deformation 19 is substantially diametrically opposed to the entryway 11 so that the film is entered in a direction that it is guided away from surface control with the cannister wall in the region 20. It is to be understood that other indentations could be used and that the shape may be changed without departing from the spirit or scope of the invention, which has features of novelty believed descriptive of its nature defined with particularly in the appended claim.

I claim:

A film cannister for receiving and coiling a length of film as it is passed through a projector comprising an inner cannister wall, said inner wall including a first substantially semi-cylindrical inner wall section, a second substantially semi-cylindrical inner wall section of larger effective diameter than that of said first wall section, an offsetting portion joining said wall sections, means providing an entryway for the film substantially diametrically opposite the offsetting portion, and means pushing the film into said entryway to contiguously engage said first inner wall section and form inside the cannister a convolution of decreasing radius spaced from said second inner wall section by the offsetting portion, thereby reducing frictional contact against the inner wall of the cannister.

References Cited by the Examiner
UNITED STATES PATENTS

| 1,954,255 | 4/1934 | Moreno | 242—71.2 |
| 2,144,622 | 1/1939 | Frost | 242—71.2 |
| 2,381,033 | 8/1945 | Bolsey | 95—31 |
| 2,674,930 | 4/1954 | Goldhammer | 95—31 |

FRANK J. COHEN, Primary Examiner.
GEORGE F. MAUTZ, Examiner.